Feb. 21, 1961 A. S. DOROSZ ET AL 2,972,670
CEMENT HANDLING APPARATUS
Filed Sept. 4, 1959 2 Sheets-Sheet 1
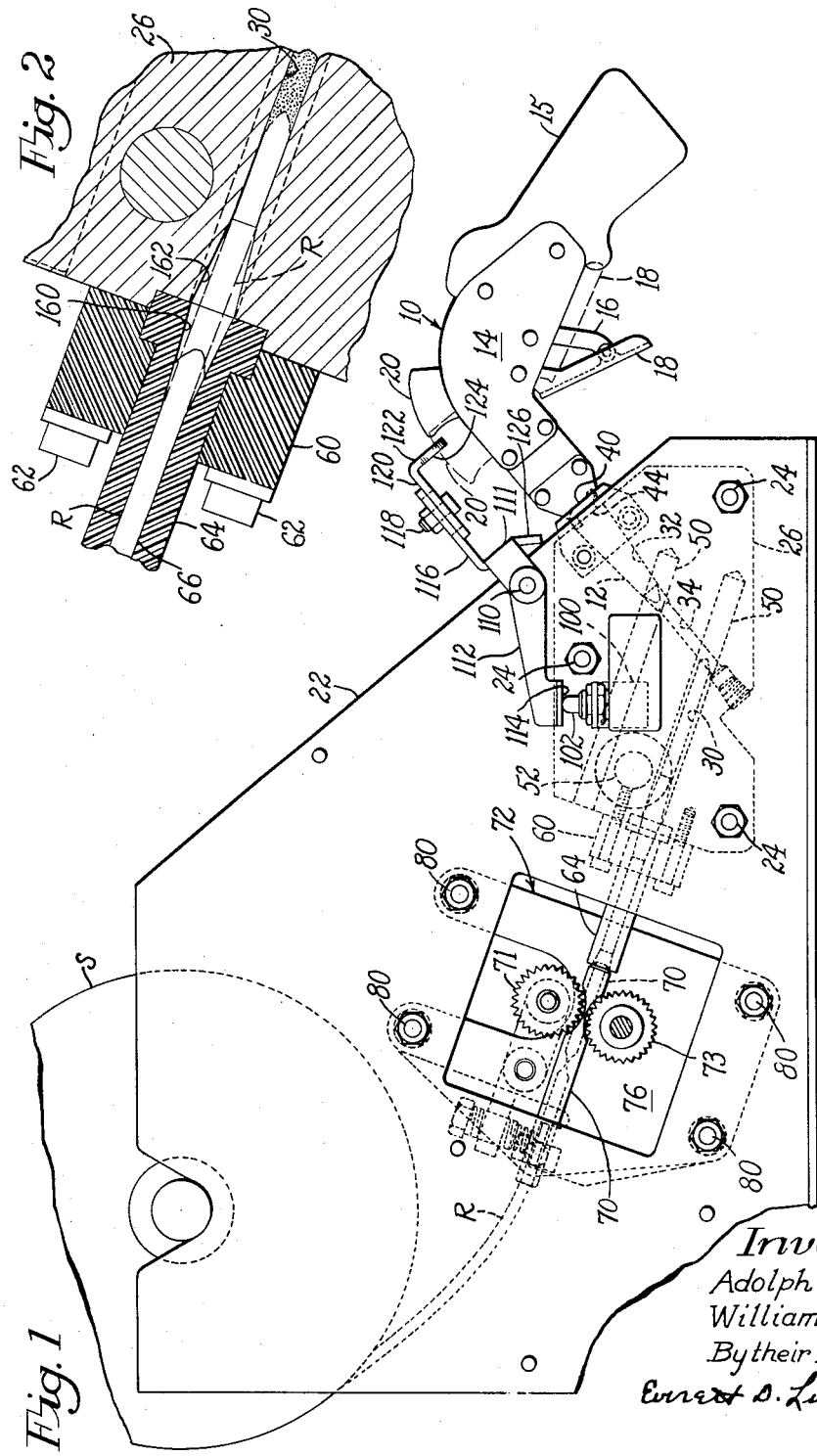
Inventors
Adolph S. Dorosz
William R. Wade
By their Attorney Feb. 21, 1961  A. S. DOROSZ ET AL  2,972,670
CEMENT HANDLING APPARATUS
Filed Sept. 4, 1959  2 Sheets-Sheet 2
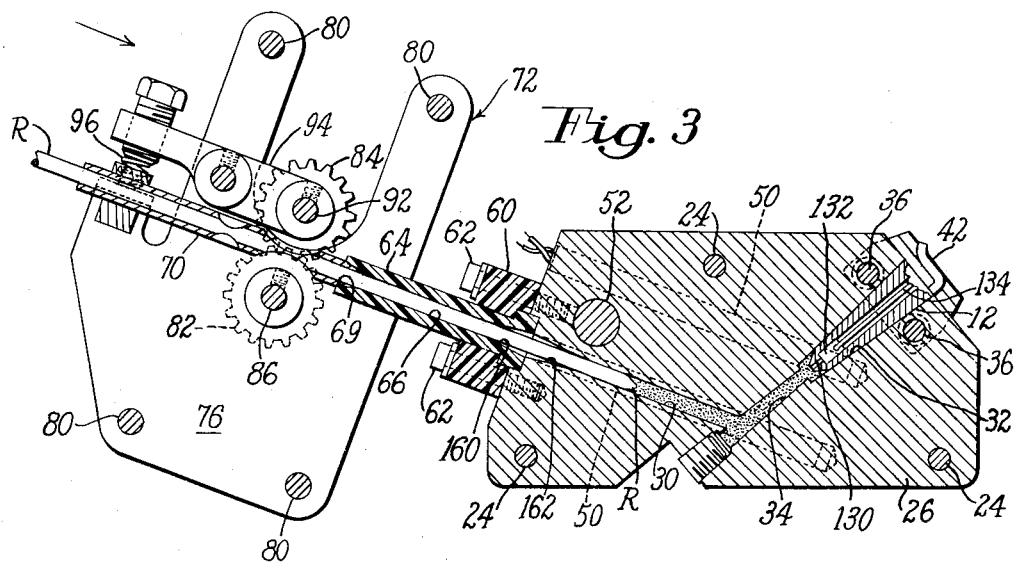
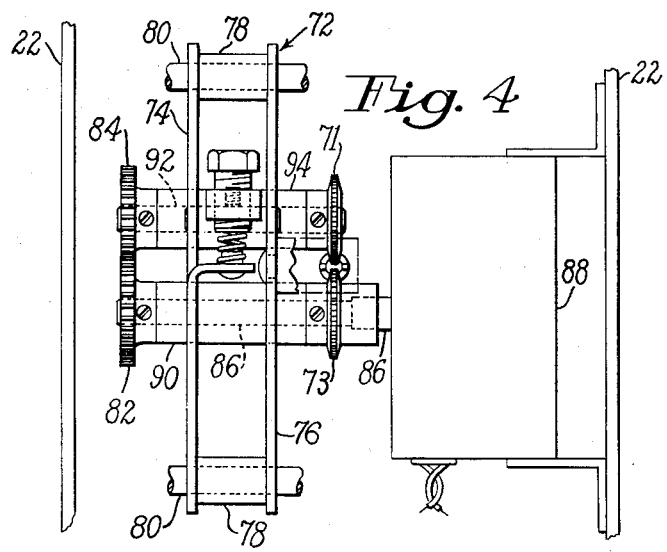

United States Patent Office 2,972,670
Patented Feb. 21, 1961

2,972,670

CEMENT HANDLING APPARATUS

Adolph S. Dorosz and William R. Wade, Beverly, Mass., assignors to United Shoe Machinery Corporation, Boston, Mass., a corporation of New Jersey Filed Sept. 4, 1959, Ser. No. 838,152

8 Claims. (Cl. 219—19)

This invention relates to apparatus for melting and feeding thermoplastic cement in rod form and is herein illustrated as embodied in a device for dispensing molten cement to a portable hand-operated cement extruding gun of the type disclosed in detail in an application for United States Letters Patent Serial No. 841,167, filed September 21, 1959, in the name of John A. Duran. It will be understood, however, that the invention is not limited to use in a device of this particular kind or to the exact mechanical construction shown.

Because of certain difficulties inherent in the handling of so-called "hot melt" adhesives, the use of thermoplastic cement in rod form has become fairly common and several devices for melting and feeding rod cement have been made available to the trade. Devices of this sort usually comprise a heated casing provided with a passageway having an inlet end to which the solid rod of cement is fed by a suitable feeding mechanism and an outlet from which molten cement is supplied to an applicator such as a nozzle or an applying roll, the solid rod of cement being melted as it travels through the mentioned passageway. In order to facilitate the melting of the cement within the passageway and the feeding of the molten cement from the outlet, a rotary member may be associated with the passageway in the manner taught in United States Letters Patent No. 2,765,768, granted October 9, 1956, on an application filed January 6, 1953, in the name of Hans C. Paulsen. To prevent the solid rod of cement from softening in the vicinity of feed wheels forming part of the feed mechanism, an inlet member is usually provided and may take the form of an elongated bushing secured to the heated casing and projecting outwardly therefrom so as to be cooled by the surrounding air, as is explained in the aforementioned patent.

A principal object of the present invention is to provide a rod cement melting and feeding device of the general type referred to above but having a novel and improved inlet member and melting passageway arrangement for facilitating the feeding of the solid rod of cement into the melting passageway which is of particular utility in devices which are used intermittently and with intervening idle periods of appreciable length of time. With this object in view, and in accordance with features of the invention, in the herein illustrated device there is secured to the heated metallic casing, which has a melting passageway therein, an elongated member of nonmetallic material provided with a lengthwise bore and projecting outwardly from the casing with the bore in alinement with the passageway, which bore is of generally circular cross section having a first portion of substantially the same diameter as the cement rod adjacent to the outer end of the member remote from the heated casing and a second portion of gradually increased diameter from the first-mentioned portion to the point where the bore joins the outer end of the passageway in the casing. More particularly, the elongated member is formed of nonmetallic heat insulating material having a very low coefficient of friction, for example, "Teflon" (polytetrafluoroethylene), and the passageway in the casing is generally circular in cross section with its outer end of a diameter substantially greater than the diameter of the rod of cement and gradually decreasing in diameter inwardly to substantially the same diameter as the rod. With this novel arrangement, as will appear below, during periods when the device is idle the heat insulating character of the elongated member will prevent softening of the solid rod outwardly beyond the heated casing, while any tendency for the cooled cement around the leading end of the rod to adhere to the bore in the elongated member, when feeding of the rod is again resumed, is very considerably lessened, not only by the low coefficient of friction of the material, but also because of the clearance space provided by the gradually increasing diameter of the bore in the elongated member considered in the direction of feed of the rod.

The above and other objects and features of the invention will appear in the following detailed description of the preferred embodiment illustrated in the accompanying drawings and will be pointed out in the claims.

In the drawings,

Fig. 1 is a view in side elevation of a rod cement melting and feeding device embodying features of the invention;

Fig. 2 is a view at an enlarged scale of a portion of that part of the device which is shown in vertical section in Fig. 3;

Fig. 3 is a view in vertical section at a slightly enlarged scale of part of the device shown in Fig. 1, and Fig. 4 is a view in elevation of a part of the device shown in Fig. 3 as viewed from the left hand side of that figure and looking in the direction of the arrow.

Referring to the drawings, the invention is shown as embodied in a device for melting cement in rod form and for feeding the molten cement to a hand-operated portable cement extruding gun, indicated by the reference character 10, Fig. 1, and having a conical nozzle 12, a body portion 14, a hand grip 15, an operating lever 16 and a trigger lever 18, one arm of which is provided with a control surface 20. Supported between side plates 22, 22, Fig. 4, by means of cross bolts 24, 24, Fig. 1, is a casing 26 which is formed of metal, such as aluminum, and provided with a passageway 30 within which the leading end of a solid rod of cement R may be melted, and a conical recess 32 for receiving the nozzle 12 of the gun 10, a bore 34 being provided in the casing for connecting the passageway 30 to the recess 32. Secured to the opposite sides of the casing 26, by means of screws 36, 36, are two oppositely facing clip members 40, 42, Figs. 1 and 3, which are adapted to receive cooperating lugs formed integrally with the nozzle portion of the gun 10, one of these lugs appearing in Fig. 1, where it is identified by the reference character 44. As will be readily apparent, the gun may be connected to the casing 26 by a slight angular movement in a clockwise direction about the axis of its nozzle 12 and disconnected therefrom by angular movement in the opposite direction. For heating the casing 26 to melt the rod of cement within the passageway 30, electrical heating units 50, 50 are inserted therein together with a temperature control device indicated by the reference character 52, Fig. 3.

Secured to the casing 26, by means of a nonmetallic clamping block 60 and screws 62, 62, is an elongated member 64 having a bore 66 extending lengthwise therethrough, this bore being in axial alinement with the passageway 30 in the casing. At its outer end, the member 64, which serves as an inlet bushing, is flared at 69 to receive one end of a hollow guide tube 70, which, together with a pair of feed wheels 71, 73, is associated with an auxiliary frame construction indicated generally by the reference character 72, Figs. 1, 3 and 4. This frame comprises a pair of spaced plates 74, 76, separated by spacers 78, 78 and supported on the side plates 22, 22 by means of cross bolts 80, 80. The feed wheels, which are connected together by means of gears 82, 84, engage the cement rod R through openings in the guide tube 70 and are adapted to be driven through a shaft 86 from a power source, indicated generally by the reference character 88 in Fig. 4, and comprising an electric motor and a gear reduction mechanism connected to the shaft 86. The lower feed wheel 73 is mounted directly on the shaft 86 which is supported in a bearing block 90 associated with the frame 72, while the upper feed wheel 71 is carried by a shaft 92 in one arm of a lever 94, Fig. 3, the coil spring 96 acting on the other arm of this lever to urge the feed wheel 71 yieldingly into engagement with the rod of cement R.

A microswitch 100, having a plunger 102, which is normally elevated to open the circuit to the motor of the power source 88, is supported on one of the side plates 22, Fig. 1. Pivotally mounted on a cross shaft 110 which passes through the two side plates 22, 22 is a U-shaped member 111, on one end of which there is an integrally formed lever arm 112 having an operating surface 114 in engagement with the plunger 102. Also formed integrally with the aforementioned U-shaped member is another lever arm 116 to which there is adjustably secured, by means of a bolt 118, a member 120 having a downwardly turned portion 122 provided with a curved operating face 124. A lip portion 126 on the U-shaped member 111 is adapted to engage one of the side plates 22 to hold the parts in the positions shown in Fig. 1, and with the switch 100 open, against the action of gravity which tends to rotate these parts in a clockwise direction.

When the gun 10 has been fully dihcharged, the control surface 20 of the trigger lever 18 will assume the position indicated by dotted lines in Fig. 1. Therefore, upon insertion of the nozzle portion 12 of the gun into the conical recess 32 and a rotation of the gun through a partial turn in a clockwise direction to the position shown in Fig. 1, the surface portion 20 will engage the curved operating face 124 and swing the lever arms 112 and 116 in a counterclockwise direction far enough to close the switch 100. The feed wheels 71, 73 will now be driven from the power source 88 so that the rod of cement R, which is stored on a supply spool S, is fed through the passageway 66 in the inlet bushing 64 and into the passageway 30 in the heated casing 26, where its leading end is progressively melted and molten cement forced through the bore 34 and into the nozzle portion 12 of the gun through a discharge orifice 130 therein. As the nozzle is thus filled, a piston 132 therein, which is connected to the operating lever 16 by a link 134, will be moved upwardly and to the right, Fig. 3, just before the chamber of the gun nozzle is filled, and the surface portion 20 of the trigger lever 18 will pass beyond the curved surface 124 on the member 120, thereby permitting the arms 112, 116 to be returned by gravity to the positions in which they are shown in Fig. 1. The switch 100 will now open and the feed wheels 71, 73 will come to a stop.

During the feeding of the rod of cement in the above manner, its leading end will be progressively melted within the passageway 30, somewhat as indicated diagrammatically in Fig. 2, with the leading end of the solid rod assuming approximately the position shown in solid lines in Fig. 3 and in dotted lines in Fig. 2. The continually entering solid rod will act as a plunger for forcing the molten cement ahead of it along the passageway 30, through the bore 34 and into the recess 130 and nozzle 12 therein. When the gun is being used, the melting and feeding device will be idle and the leading end of the cement rod R will be gradually melted back toward the left hand end of the passageway 30. In order to prevent this melting of the rod of cement from continuing outwardly through the inlet bushing 64 and to the vicinity of the feed wheels 71, 73, this bushing is made of a nonmetallic and highly heat insulating material, preferably "Teflon" (polytetrafluoroethylene). Thus, even though the melting and feeding device may be idle for a long period of time, the melting back of the solid rod will terminate substantially in the location indicated in solid lines in Fig. 2. In addition to its heat insulating characteristics, "Teflon" has a very low coefficient of friction and thus there is little or no tendency for the relatively cold and solid end of the rod of cement to become adhered to the bore within the bushing 64 by the partially melted cement therearound. In order further to assure that the leading end of the rod of cement will not stick in the bushing 64 when feeding of the rod is again resumed, the following arrangement is provided.

The bore 66 of the inlet bushing 64, which is of generally circular cross section, corresponding to that of the rod of cement, has a main portion adjacent to its outer end and remote from the casing which is of a diameter substantially the same as that of the rod of cement R and is provided with another portion 160 which gradually increases in diameter to the point where it joins the outer end of the passageway 30 in the casing 26. Also, the passageway 30, which is of generally circular cross section and of a diameter set substantially the same as that of the rod of cement, is provided with an outer end which is of a diameter substantially greater than that of the rod of cement and a portion which gradually decreases in diameter inwardly to the same diameter as that of the rod, as indicated at 162, Figs. 2 and 3. With this improved arrangement, the solid leading end of the rod of cement R, see Fig. 2 as it commences to feed along, moves into areas of progressively increasing size so that any tendency for the leading end of the rod to stick or bend is greatly lessened. In addition, the tapering portions 160, 162 of the bore 66 and passageway 30 provide a space in which the expanding molten cement may be accommodated instead of working back through the clearance space between the rod of cement R and the bore 66, or through the grooves in the rod R where rod cement of the particular type disclosed and claimed in United States Letters Patent No. 2,874,084, granted February 17, 1959, on an application filed in the name of Hans C. Paulsen, is being used.

Having thus described our invention what we claim as new and desire to secure by Letters Patent of the United States is:

1. In a device for melting and feeding cement in the form of a rod of indefinite length and generally circular in cross section, a casing formed to provide a passageway therein, means for heating the casing to melt the leading end of a rod of cement within the passageway, an elongated member formed with a bore extending lengthwise therein secured to and projecting outwardly from the casing with the bore in alinement with said passageway, and means for feeding the leading end of a solid rod of cement through the bore in said member and into the passageway in said casing, said bore being of generally cylindrical cross section and having a first portion of substantially the same diameter as that of the rod of cement adjacent to its outer end remote from the casing and a second portion of gradually increasing diameter from the first portion to the point where it joins the outer end of the passageway in said casing.

2. In a device for melting and feeding cement in the form of a rod of indefinite length and generally circular in cross section, a casing formed to provide a passageway therein generally circular in cross section and with its outer end of a diameter substantially greater than the diameter of the rod of cement and gradually decreasing in diameter inwardly to substantially the same diameter as that of the rod of cement, means for heating the casing to melt the leading end of a rod of cement within the passageway, an elongated member formed with a bore extending lengthwise therein secured to and projecting outwardly from the casing with the bore in alinement with said passageway, and means for feeding the leading end of a solid rod of cement through the bore in said member and into the passageway in said casing, said bore being of generally cylindrical cross section and having a first portion of substantially the same diameter as that of the rod of cement adjacent to its outer end remote from the casing and a second portion of gradually increasing diameter from the first portion to the point where it joins the outer end of the passageway in said casing.

3. In a device for melting and feeding cement in the form of a rod of indefinite length and generally circular in cross section, a metallic casing formed to provide a passageway therein, means for heating the casing to melt the leading end of a rod of cement within the passageway, an elongated member formed of non-metallic material and with a bore extending lengthwise therein secured to and projecting outwardly from the casing with the bore in alignment with said passageway, and means for feeding the leading end of a solid rod of cement through the bore in said member and into the passageway in said casing, said bore being of generally cylindrical cross section and having a first portion of substantially the same diameter as that of the rod of cement adjacent to its outer end remote from the casing and a second portion of gradually increasing diameter from the first portion to the point where it joins the outer end of the passageway in said casing.

4. In a device for melting and feeding cement in the form of a rod of indefinite length and generally circular in cross section, a metallic casing formed to provide a passageway therein generally circular in cross section and with its outer end of a diameter substantially greater than the diameter of the rod of cement and gradually decreasing in diameter inwardly to substantially the same diameter as that of the rod of cement, means for heating the casing to melt the leading end of a rod of cement within the passageway, an elongated member formed of non-metallic material and with a bore extending lengthwise therein secured to and projecting outwardly from the casing with the bore in alinement with said passageway, and means for feeding the leading end of a solid rod of cement through the bore in said member and into the passageway in said casing, said bore being of generally cylindrical cross section and having a first portion of substantially the same diameter as that of the rod of cement adjacent to its outer end remote from the casing and a second portion of gradually increasing diameter from the first portion to the point where it joins the outer end of the passageway in said casing.

5. In a device for melting and feeding cement in the form of a rod of indefinite length and generally circular in cross section, a metallic casing formed to provide a passageway therein, means for heating the casing to melt the leading end of a rod of cement within the passageway, an elongated member formed of non-metallic heat insulating material having a low coefficient of friction and with a bore extending lengthwise therein secured to and projecting outwardly from the casing with the bore in alinement with said passageway, and means for feeding the leading end of a solid rod of cement through the bore in said member and into the passageway in said casing, said bore being of generally cylindrical cross section and having a first portion of substantially the same diameter as that of the rod of cement adjacent to its outer end remote from the casing and a second portion of gradually increasing diameter from the first portion to the point where it joins the outer end of the passageway in said casing.

6. In a device for melting and feeding cement in the form of a rod of indefinite length and generally circular in cross section, a metallic casing formed to provide a passageway therein generally circular in cross section and with its outer end of a diameter substantially greater than the diameter of the rod of cement and gradually decreasing in diameter to substantially the same diameter as that of the rod of cement, means for heating the casing to melt the leading end of a rod of cement within the passageway, an elongated member formed of non-metallic heat insulating material having a low coefficient of friction and with a bore extending lengthwise therein secured to and projecting outwardly from the casing with the bore in alinement with said passageway, and means for feeding the leading end of a solid rod of cement through the bore in said member and into the passageway in said casing, said bore being of generally cylindrical cross section and having a first portion of substantially the same diameter as that of the rod of cement adjacent to its outer end remote from the casing and a second portion of gradually increasing diameter from the first portion to the point where it joins the outer end of the passageway in said casing.

7. In a device for melting and feeding cement in the form of a rod of indefinite length and generally circular in cross section, a casing formed to provide a passageway therein generally circular in cross section and with its outer end of a diameter substantially greater than the diameter of the rod of cement and gradually decreasing in diameter inwardly to substantially the same diameter as that of the rod of cement, means for heating the casing to melt the leading end of a rod of cement within the passageway, an elongated member formed of polytetrafluoroethylene and with a bore extending lengthwise therein secured to and projecting outwardly from the casing with the bore in alinement with said passageway and means for feeding the leading end of a solid rod of cement through the bore in said member and into the passageway in said casing, said bore being of generally cylindrical cross section and having a first portion of substantially the same diameter as that of the rod of cement adjacent to its outer end remote from the casing and a second portion of gradually increasing diameter from the first portion to the point where it joins the outer end of the passageway in said casing.

8. In a device for melting and feeding cement in the form of a rod of indefinite length and generally circular in cross section, a metallic casing formed to provide a passageway therein generally circular in cross section and with its outer end of a diameter substantially greater than the diameter of the rod of cement and gradually decreasing in diameter inwardly to substantially the same diameter as that of the rod of cement, means for heating the casing to melt the leading end of a rod of cement within the passageway, an elongated member formed of polytetrafluoroethylene and with a bore extending lengthwise therein secured to and projecting outwardly from the casing with the bore in alinement with said passageway, and means for feeding the leading end of a solid rod of cement through the bore in said member and into the passageway in said casing, said bore being of generally cylindrical cross section and having a first portion of substantially the same diameter as that of the rod of cement adjacent to its outer end remote from the casing and a second portion of gradually increasing diameter from the first portion to the point where it joins the outer end of the passageway in said casing.

References Cited in the file of this patent

UNITED STATES PATENTS

| | | |
|---|---|---|
| 2,871,818 | Jorgensen | Feb. 3, 1959 |
| 2,928,370 | Gross | Mar. 15, 1960 |